United States Patent
Kwon et al.

(10) Patent No.: US 10,686,233 B2
(45) Date of Patent: Jun. 16, 2020

(54) METAL-AIR BATTERY AND METHOD OF OPERATING THE METAL-AIR BATTERY

(71) Applicant: SAMSUNG ELECTRONICS CO., LTD., Suwon-si, Gyeonggi-do (KR)

(72) Inventors: Hyukjae Kwon, Suwon-si (KR); Jeongsik Ko, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 340 days.

(21) Appl. No.: 15/141,144

(22) Filed: Apr. 28, 2016

(65) Prior Publication Data

US 2016/0322682 A1 Nov. 3, 2016

(30) Foreign Application Priority Data

Apr. 30, 2015 (KR) .................. 10-2015-0062014

(51) Int. Cl.
*H01M 12/06* (2006.01)
*H01M 12/02* (2006.01)
*H01M 12/08* (2006.01)

(52) U.S. Cl.
CPC .......... *H01M 12/08* (2013.01); *Y02E 60/128* (2013.01)

(58) Field of Classification Search
CPC combination set(s) only.
See application file for complete search history.

(56) References Cited

U.S. PATENT DOCUMENTS

| 5,487,955 A * | 1/1996 | Korall ............... H01M 6/5038 429/113 |
| 5,607,787 A * | 3/1997 | Wedlake ............. H01M 10/42 429/62 |
| 5,871,625 A * | 2/1999 | Leddy ................ B03C 1/00 106/316 |
| 6,451,463 B1 * | 9/2002 | Tsai .................. H01M 6/5011 429/406 |
| 8,790,802 B2 | 7/2014 | Nakanishi |
| 9,634,365 B2 | 4/2017 | Park et al. |
| 10,069,181 B2 | 9/2018 | Ko et al. |
| 2001/0030127 A1 * | 10/2001 | Li ..................... B01D 53/228 204/252 |

(Continued)

FOREIGN PATENT DOCUMENTS

| JP | 2010267476 A | 11/2010 |
| KR | 101044428 B1 | 6/2011 |

(Continued)

OTHER PUBLICATIONS

Gallagher, et al., Energy & Enviromental Science, EES_press_ Quantifying the Promise of Lithium-Air batteries for Electric Vehicles, 18 Pages, Aug. 24, 2015.

*Primary Examiner* — Kaity V Chandler
(74) *Attorney, Agent, or Firm* — Cantor Colburn LLP

(57) ABSTRACT

A metal-air battery includes a battery cell module which generates electricity through metal oxidation and oxygen reduction, a buffer tank which fluidly communicates with the battery cell module and has an internal pressure higher than an internal pressure of the battery cell module, and a first fluid intermittent portion which controls a flow of fluid from the battery cell module to an outside of the battery cell module, based on predetermined open and close periods.

19 Claims, 9 Drawing Sheets

(56) References Cited

U.S. PATENT DOCUMENTS

| | | | |
|---|---|---|---|
| 2005/0130009 A1* | 6/2005 | Hasegawa | H01M 8/04186 429/414 |
| 2005/0147854 A1* | 7/2005 | Sone | H01M 8/04089 429/450 |
| 2006/0068246 A1* | 3/2006 | Matsuo | H01M 8/04089 429/410 |
| 2011/0200850 A1 | 8/2011 | Gottwick et al. | |
| 2013/0078535 A1* | 3/2013 | Aizawa | H01M 4/8657 429/403 |
| 2013/0337349 A1 | 12/2013 | Brost et al. | |
| 2015/0140452 A1 | 5/2015 | Park et al. | |
| 2015/0333384 A1 | 11/2015 | Lee et al. | |
| 2015/0340747 A1 | 11/2015 | Kwon et al. | |
| 2016/0329618 A1* | 11/2016 | Zhang | H01M 12/08 |

FOREIGN PATENT DOCUMENTS

| | | |
|---|---|---|
| KR | 1020130112314 A | 10/2013 |
| KR | 1020130112315 A | 10/2013 |
| KR | 1020150058616 A | 5/2015 |
| KR | 1020150131883 A | 11/2015 |
| KR | 1020150135918 A | 12/2015 |
| KR | 1020160024609 A | 3/2016 |
| KR | 1020160031830 A | 3/2016 |

\* cited by examiner

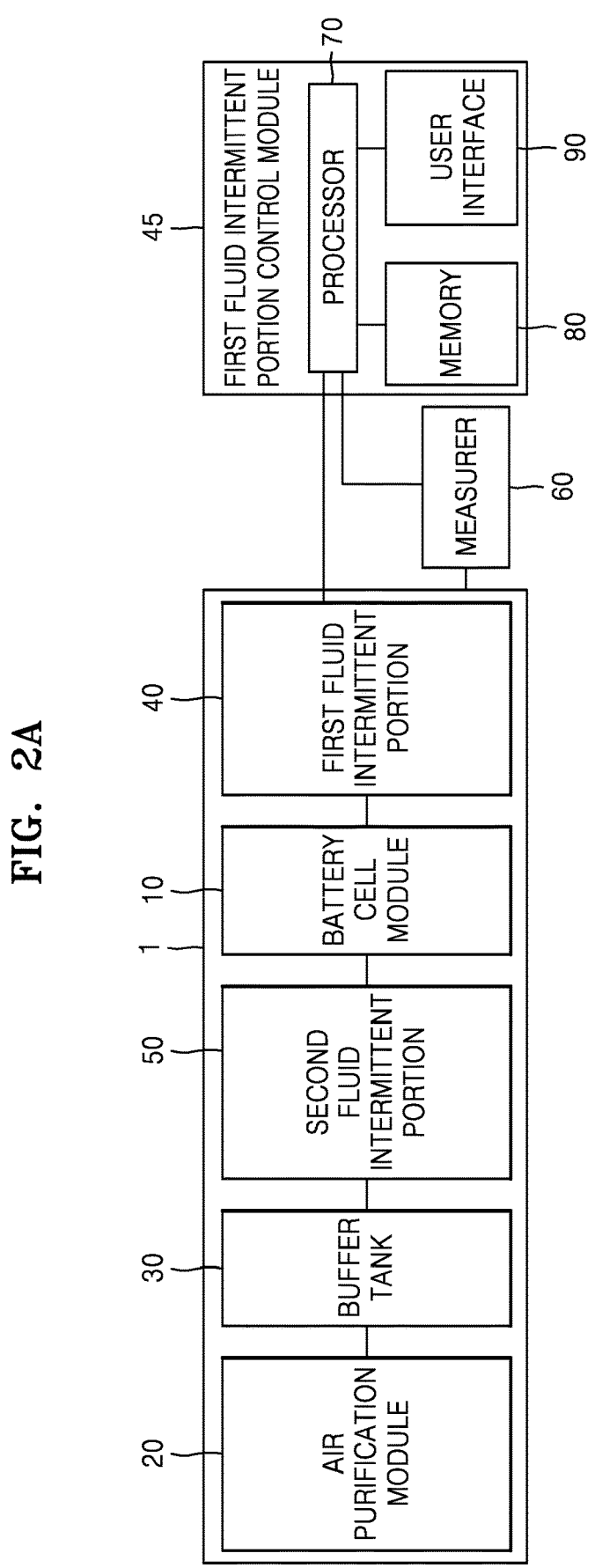

METAL-AIR BATTERY AND METHOD OF OPERATING THE METAL-AIR BATTERY

CROSS-REFERENCE TO RELATED APPLICATION

This application claims priority to Korean Patent Application No. 10-2015-0062014, filed on Apr. 30, 2015, and all the benefits accruing therefrom under 35 U.S.C. § 119, the content of which in its entirety is herein incorporated by reference.

BACKGROUND

1. Field

The disclosure relates to a metal-air battery and a method of operating the metal-air battery.

2. Description of the Related Art

Metal-air batteries each include a plurality of metal-air battery cells, and each metal-air battery cell includes a negative electrode capable of intercalating/deintercalating ions and a positive electrode using oxygen included in the air as an active material. Oxygen is introduced from outside the metal-air battery cell and a reduction/oxidation reaction occurs between oxygen and metal ion at the positive electrode while an oxidation/reduction reaction occurs in the metal at the negative electrode. Then, electric energy is obtained from the conversion of chemical energy generated by such reactions. For example, a metal-air battery absorbs oxygen when being discharged and emits oxygen when being charged. As described above, since metal-air batteries use oxygen present in the air, the energy density of the metal-air batteries may be substantially increased. For example, the energy density of metal-air batteries may be several times higher than the energy density of the existing lithium ion batteries.

In addition, since there is a low possibility of metal-air batteries catching on fire due to abnormal high-temperature conditions, metal-air batteries have high stability, and since metal-air batteries are operated by absorbing/discharging oxygen without having to use a heavy metal, metal-air batteries may cause less environmental pollution. Due to such characteristics described above, much research into metal-air batteries is currently being conducted.

SUMMARY

When a metal-air battery is operated, air is supplied to a positive electrode and molecular oxygen is used as an active material. A device for supplying air to the metal-air battery and discharging impurities in the metal-air battery may be desired.

Provided are embodiments of a metal-air battery and a method of operating the metal-air battery including a device that supplies air to the metal-air battery and discharges impurities in the metal-air battery.

According to an exemplary embodiment, a metal-air battery includes a battery cell module which generates electricity through metal oxidation and oxygen reduction; a buffer tank which fluidly communicates with the battery cell module and has an internal pressure higher than an internal pressure of the battery cell module; an air purification module which fluidly communicates with the buffer tank and provides purified air to the buffer tank; a first fluid intermittent portion which controls a flow of fluid from the battery cell module to an outside of the battery cell module, based on predetermined open and close periods.

In an exemplary embodiment, the metal-air battery may further include a second fluid intermittent portion which controls a flow of fluid from the buffer tank to the battery cell module.

In an exemplary embodiment, the first fluid intermittent portion may open and close a path of the flow of the fluid from the battery cell module to the outside, based on the predetermined open and close periods.

In an exemplary embodiment, the metal-air battery may further include a voltage measurer which measures a discharge voltage of the metal-air battery, in which the predetermined open and close periods may be determined based on a comparison between a predetermined reference discharge voltage and the measured discharge voltage.

In an exemplary embodiment, the metal-air battery according to an exemplary embodiment may further include a current measurer which measures a discharge current of the metal-air battery, in which the predetermined open and close periods may be determined based on a comparison between a predetermined reference discharge current with a discharge current measured by the current measurer.

In an exemplary embodiment, the metal-air battery according to an exemplary embodiment may further include an oxygen concentration measurer which measures an oxygen concentration in the battery cell module, in which the predetermined open and close periods may be determined based on a comparison between a predetermined reference oxygen concentration and the measured oxygen concentration.

In an exemplary embodiment, a difference between the internal pressure of the battery cell module and the internal pressure of the buffer tank may be in a range of about 0.5 bar to about 1 bar.

In an exemplary embodiment, the second fluid intermittent portion may include a check valve.

In an exemplary embodiment, the first fluid intermittent portion may include an electromagnetic driving type opening/closing valve.

According to another exemplary embodiment, a method of operating the metal-air battery described above includes: flowing purified air at a constant flow rate into the buffer tank from the air purification module; inputting an intermittent signal corresponding to the predetermined open and close periods; and controlling the flow of the fluid from the battery cell module to the outside, based on the predetermined close and open periods.

In an exemplary embodiment, the method may further include inputting a reference discharge voltage of the metal-air battery; measuring a discharge voltage of the metal-air battery; comparing a level of the reference discharge voltage with a level of the discharge voltage; and adjusting at least one of the predetermined close and open periods of the first fluid intermittent portion such that the predetermined open period increases or the predetermined close period is reduced, when the discharge voltage is less than the reference discharge voltage.

In an exemplary embodiment, the method may further include adjusting at least one of the predetermined close and open periods of the first fluid intermittent portion such that the predetermined open period is reduced or the predetermined close period increases, when the discharge voltage is greater than the reference discharge voltage.

In an exemplary embodiment, the method may further include: inputting a reference discharge current of the metal-air battery; measuring a discharge current of the metal-air battery; comparing the reference discharge current with the measured discharge current; and adjusting of at least one of the predetermined close and open periods of the first fluid intermittent portion such that the predetermined open period increases or the predetermined close period is reduced, when the measured discharge current is larger than the reference discharge current.

In an exemplary embodiment, the method may further include adjusting at least one of the predetermined close and open periods of the first fluid intermittent portion such that the predetermined open period is reduced or the predetermined close period increases, when the measured discharge current is smaller than the reference discharge current.

In an exemplary embodiment, the method may further include: inputting a reference oxygen concentration in the battery cell module; measuring oxygen concentration in the battery cell module; comparing the reference oxygen concentration to the measured oxygen concentration; and adjusting at least one of the predetermined close and open periods of the first fluid intermittent portion such that the predetermined open period increases or the predetermined close period is reduced, when the oxygen concentration is less than the reference oxygen concentration.

In an exemplary embodiment, the method may further include adjusting at least one of the predetermined close and open periods of the first fluid intermittent portion such that the predetermined open period is reduced or the predetermined close period increases, when the oxygen concentration is greater than the reference oxygen concentration.

BRIEF DESCRIPTION OF THE DRAWINGS

These and/or other features of embodiments of the invention will become apparent and more readily appreciated from the following description of the exemplary embodiments, taken in conjunction with the accompanying drawings, in which:

FIGS. 2A and 2B are schematic block diagrams illustrating a metal-air battery according to an exemplary embodiment;

DETAILED DESCRIPTION

Figure 1A:
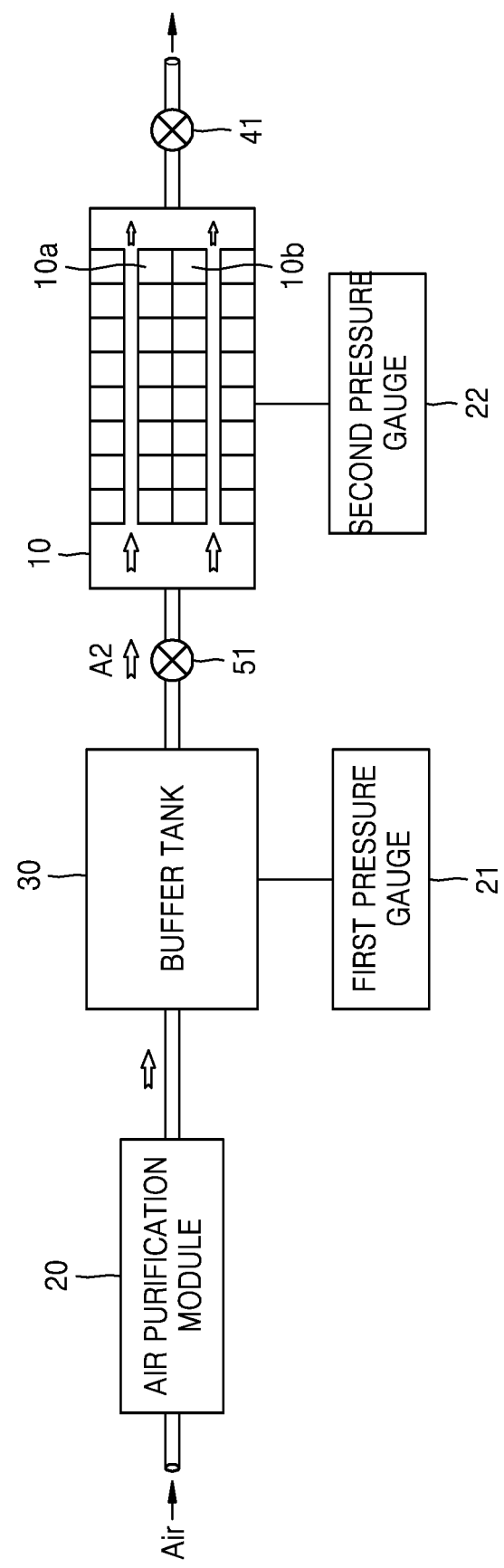
FIG. 1A is a schematic view illustrating a metal-air battery according to an exemplary embodiment.

Reference will now be made in detail to exemplary embodiments, examples of which are illustrated in the accompanying drawings, in which like reference numerals refer to like elements throughout. In this regard, exemplary embodiments may have different forms and should not be construed as being limited to the descriptions set forth herein. Accordingly, the exemplary embodiments described herein are merely described below, by referring to the figures, to explain aspects. Expressions such as "at least one of," when preceding a list of elements, modify the entire list of elements and do not modify the individual elements of the list.

Hereinafter, it will be understood that when an element or layer is referred to as being "on" or "in contact with" another element or layer, it can be directly on or in contact with the other element or layer or intervening elements or layers may be present. It will be also understood that although the terms first, second, third etc. may be used herein to describe various elements, these elements should not be limited by these terms. These terms are only used to distinguish one element from another element.

The singular forms "a," "an" and "the" are intended to include the plural forms as well, unless the context clearly indicates otherwise. Furthermore, when a part "includes" or "comprises" an element, unless there is a particular description contrary thereto, the part can further include other elements, not excluding the other elements.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

le;.4qUnless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1B:
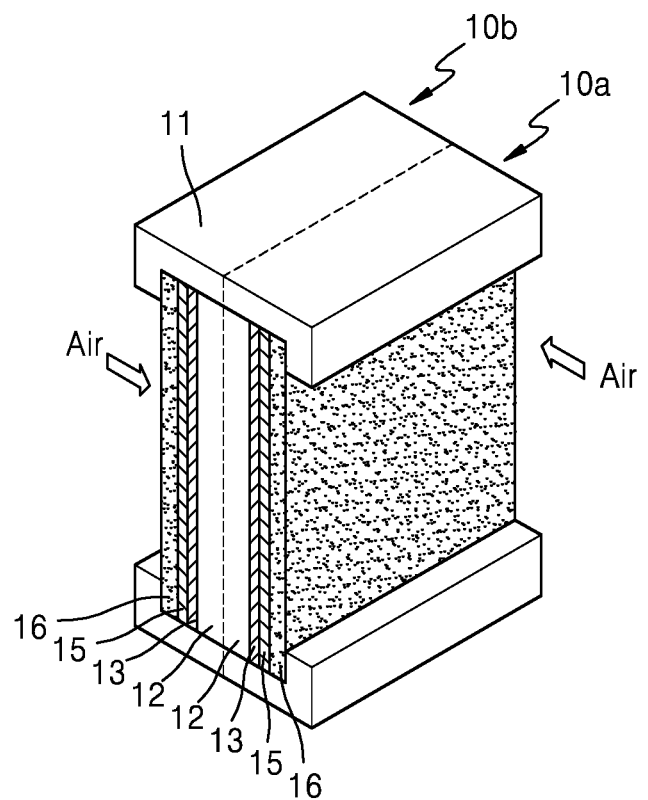
FIG. 1B is a schematic view illustrating battery cells of FIG. 1A.
Figure 2B:
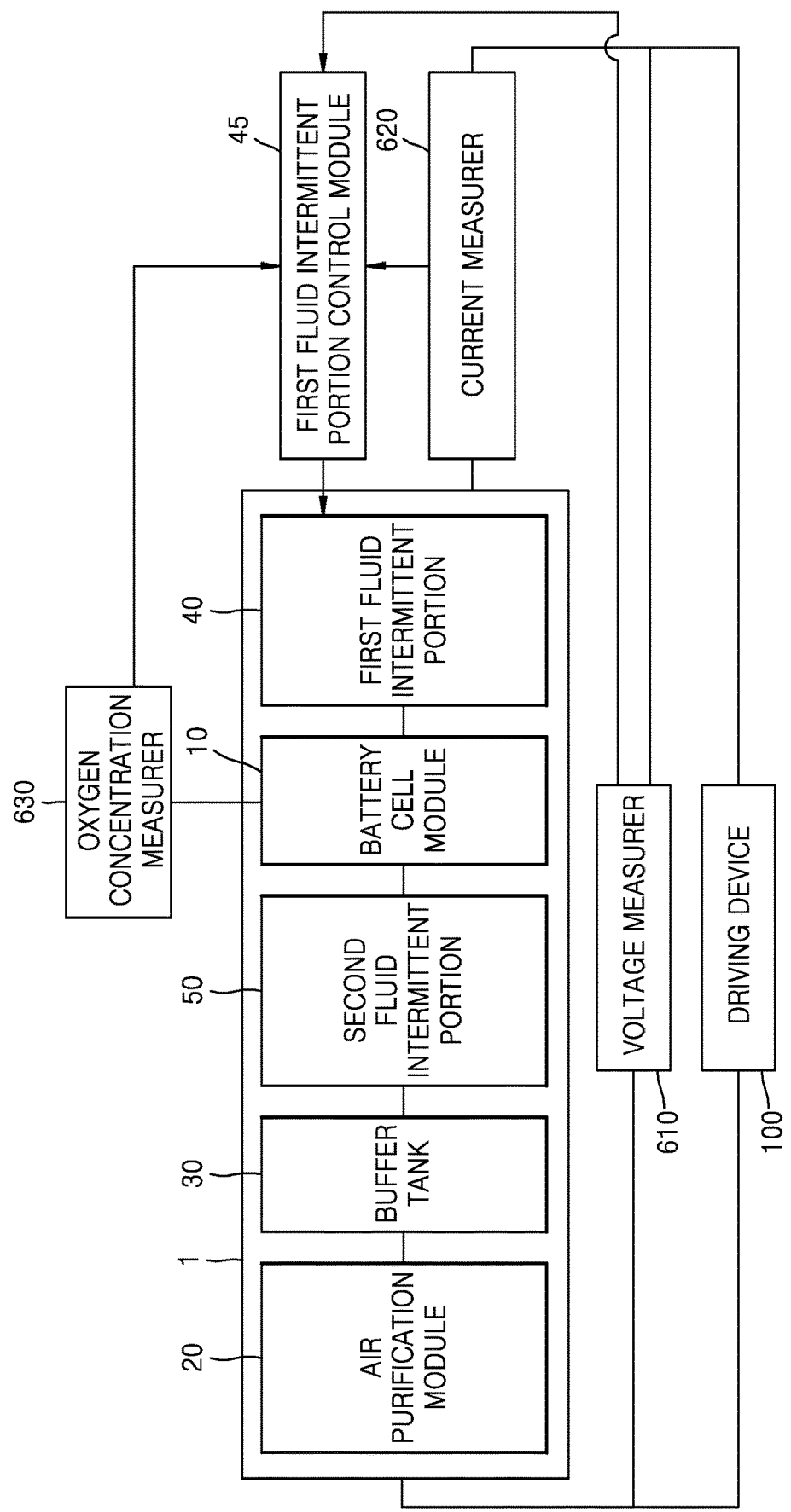

FIG. 1A is a schematic view illustrating a metal-air battery 1 according to an exemplary embodiment, and FIG. 1B is a schematic view illustrating battery cells 10a and 10b of FIG. 1A. FIGS. 2A and 2B are schematic block diagrams illustrating a metal-air battery according to an exemplary embodiment.

Referring to FIGS. 1A to 2B, an exemplary embodiment of the metal-air battery 1 may include a battery cell module 10, an air purification module 20, a buffer tank 30, a first fluid intermittent portion 40, and a second fluid intermittent portion 50. The battery cell module 10 may generate electricity through metal oxidation and oxygen reduction. In one exemplary embodiment, For example, where the metal in the metal-air battery 1 is lithium, the metal-air battery 1 may be discharged by reacting lithium (Li) and oxygen in an oxidation reaction according to Reaction Formula 1 shown below, in which lithium peroxide ($Li_2O_2$) is formed, or may be charged by a reduction reaction according to Reaction Formula 2, in which lithium peroxide ($Li_2O_2$) is decomposed into lithium ions and oxygen and electrons are discharged.

$2Li + 2e^- + O_2 \rightarrow Li_2O_2$       [Reaction Formula 1]

$Li_2O_2 \rightarrow 2Li^+ + 2e^- + O_2$       [Reaction Formula 2]

However, in such an embodiment, the metal in the metal-air battery 1 is not limited to lithium (Li). Alternatively, the metal in the metal-air battery 1 may be sodium (Na), zinc (Zn), potassium (K), calcium (Ca), magnesium (Mg), iron (Fe), aluminum (Al) or an alloy formed of two or more of the metals described above, for example.

The battery cell module 10 may include a plurality of battery cells 10a and 10b, and the battery cells 10a and 10b may include a housing 11, a negative electrode metal layer 12, a negative electrode electrolyte membrane 13, a positive electrode layer 15, and a gas diffusion layer 16.

The housing 11 may store and seal the negative electrode metal layer 12, the negative electrode electrolyte membrane 13, the positive electrode layer 15 and the gas diffusion layer 16.

The negative electrode metal layer 12 may intercalate/deintercalate metal ions. The negative electrode metal layer 12 may include Li, Na, Zn, K, Ca, Mg, Fe, Al or an alloy formed of two or more of the metals described above, for example.

The negative electrode electrolyte membrane 13 may transmit metal ion to the positive electrode layer 15 via an oxygen block layer 14. Therefore, the negative electrode electrolyte membrane 13 may include an electrolyte. In one exemplary embodiment, for example, the electrolyte may be in a solid phase including a polymeric electrolyte, an inorganic electrolyte or a composite electrolyte thereof, or may be formed by dissolving metal salt in a solvent.

The positive electrode layer 15 may include an electrolyte for conduction of metal ions, a catalyst for oxidation and reduction of oxygen, a conductive material, and a binder. In one exemplary embodiment, for example, a positive electrode slurry may be manufactured by adding a solvent after mixing the electrolyte, the catalyst, the conductive material, and the binder. The positive electrode layer 15 may be provided or formed after coating the oxygen block layer 14 with the positive electrode slurry and drying the same. The solvent may be the same as that used for manufacturing of an electrolyte included in the negative electrode electrolyte membrane 13.

The gas diffusion layer 16 may evenly supply purified air to the positive electrode layer 15. The gas diffusion layer 16 may include a metal having a porous structure, ceramics, polymer, carbon materials, or a combination of two or more thereof. In such an embodiment, where the gas diffusion layer 16 has a porous structure, the gas diffusion layer 16 may absorb air discharged from the air purification module 20 and smoothly diffuse the air to a pore or a void which is formed in the gas diffusion layer 16.

The air purification module 20 purifies air by removing moisture in the air or impurities such as carbon dioxide and may supply the purified air A2 to the battery cell module 10. The air purification module 20 may be disposed to directly fluidly communicate with the battery cell module 10 or may be disposed to fluidly communicate with the battery cell module 10 via a buffer tank 30 that will be described later in detail.

The air purification module 20 may operate according to pressure swing adsorption ("PSA"), temperature swing adsorption ("TSA"), pressure temperature swing adsorption ("PTSA"), vacuum swing adsorption ("VSA"), selective separation or two or more of methods thereof. Herein, "PSA" means a technique which is operated according to principle in which a specific gas is preferentially adsorbed to or captured by an adsorption material at a high pressure and desorbed or discharged when the pressure is reduced, "TSA" means a technique which is operated according to principle in which a specific gas is preferentially adsorbed to or captured by an adsorption material at normal temperature and desorbed or discharged when the temperature rises, "PTSA" means a technique in which "PSA" and "TSA" are combined, and "VSA" means a technique which is operated according to principle in which a specific gas is preferentially adsorbed to or captured by an adsorption material near atmospheric pressure and desorbed or discharged under vacuum conditions.

The buffer tank 30 is an air storage part which may temporarily store purified air A2 received from the air purification module 20 and transmit the stored purified air A2 to the battery cell module 10. In one exemplary embodiment, for example, the buffer tank 30 is disposed to fluidly communicate with the battery cell module 10 and the air purification module 20, and may transmit purified air from the air purification module 20 to the battery cell module 10. In an exemplary embodiment, an internal pressure of the buffer tank 30 may be increased to be greater than an internal pressure of the battery cell module 10.

According to a difference between the internal pressure of the buffer tank 30 and the internal pressure of the battery cell module 10, the purified air A2 may be directly transmitted from the buffer tank 30 to the battery cell module 10. In one exemplary embodiment, for example, the purified air A2 may be continuously flowed, at a substantially constant rate, into the buffer tank 30 from the air purification module 20. In a discharging process, the difference between the internal pressure of the buffer tank 30 and the internal pressure of the battery cell module 10 may be maintained to be in a predetermined range, for example, in a range of about 0.5 bar to about 1 bar by using a first pressure gauge 21 and a second pressure gauge 22, which are disposed in or connected to the battery cell module 10 and the buffer tank 30, respectively. Therefore, in such an embodiment, the purified air A2 flowed into the buffer tank 30 from the air purification module 20 may be directly transmitted from the buffer tank 30 to the battery cell module 10 without a separate pressurization unit or decompression unit.

The second fluid intermittent portion 50 is a cutoff device which is disposed between the battery cell module 10 and the buffer tank 30 and capable of controlling, e.g., closing, fluid communication between the battery cell module 10 and the buffer tank 30. In one exemplary embodiment, for example, the second fluid intermittent portion 50 may include a check valve 51, and thus, may close the fluid communication in a predetermined direction, e.g., a predetermined single direction.

In one exemplary embodiment, for example, where the check valve 51 is disposed between the battery cell module 10 and the buffer tank 30 as the second fluid intermittent portion 50, the purified air A2 is transmitted from the buffer tank 30 to the battery cell module 10. In such an embodiment, the check valve 51 may effectively prevent impurities generated in the battery cell module 10 from being transmitted to the buffer tank 30 during a discharging process of the metal-air battery 1.

When the metal-air battery 1 is discharged, molecular oxygen may be used as an active material by supplying air to the positive electrode as known from Reaction Formula 1 described above. Here, impurities such as $H_2O$ and $CO_2$ included in the air disrupt formation of metal peroxide (for example, $Li_2O_2$) and thus may reduce the capacity and life expectancy of the metal-air battery 1.

Furthermore, as the metal-air battery 1 is charged, oxygen is continuously generated from the positive electrode according to Reaction Formula 2 described above, and thus the amount of oxygen may increase in the battery cell module 10. As a result, charging efficiency may be reduced due to difficulty of generating chemical reaction according to Reaction Formula 2. Therefore, in an exemplary embodiment, when the metal-air battery 1 is charged or discharged, the impurities in the metal-air battery 1 may be discharged to the outside according to a use condition of the battery cell module 10 and an internal condition of the battery cell module 10.

The first fluid intermittent portion 40 is a cutoff device capable of controlling, e.g., closing, fluid communication between from the battery cell module 10 to the outside. In one exemplary embodiment, for example, the first fluid intermittent portion 40 may be disposed in a discharge part of the battery cell module 10 and close the fluid communication between the battery cell module 10 and the outside.

In one exemplary embodiment, for example, the first fluid intermittent portion 40 may be an electromagnetic driving type opening/closing valve 41. In an exemplary embodiment, the first fluid intermittent portion 40 may periodically adjust the flow of fluid discharged from the battery cell module 10 to the outside by opening or closing the electromagnetic driving type opening/closing valve 41 according to predetermined open and close periods. The electromagnetic driving type opening/closing valve 41 may be operated by an electromagnetic drive device such as a solenoid, and may switch between opening and closing the opening/closing valve based on on/off values of a pulse-shaped excitation current transmitted to the solenoid. In such an embodiment, where open and close periods of the electromagnetic driving type opening/closing valve 41 are controlled by a control signal output from a processor 70, fluid discharge from the battery cell module 10 may be controlled with high accuracy and responsiveness.

The first fluid intermittent portion 40 may control or change at least one of an opening size and an opening period to control the flow of the fluid discharged from the battery cell module 10. Hereinafter, the first fluid intermittent portion 40 capable of controlling the flow of the fluid discharged from the battery cell module 10 by controlling the open and close periods of flow corresponding to the fluid discharged from the battery cell module 10 will be described. In one exemplary embodiment, for example, the first fluid intermittent portion 40 may control the flow of the fluid discharged from the battery cell module 10 according to a periodic cycle in which the first fluid intermittent portion 40 intermittently opens and closes the electromagnetic driving type opening/closing valve 41.

A first fluid intermittent portion control module 45 is a control device which may control the open and close periods of the first fluid intermittent portion 40 by transmitting a control signal corresponding to the open and close periods of the first fluid intermittent portion 40. In one exemplary embodiment, for example, the first fluid intermittent portion control module 45 may include the processor 70, a memory 80 and a user interface 90.

In an exemplary embodiment, the processor 70 may be a hardware that controls a general function and operation of the metal-air battery 1. The processor 70 may control the first fluid intermittent portion 40 according to usage conditions of the metal-air battery 1 measured by a measurer 60 by executing a program stored in the memory 80. The processor 70 may control not only the first fluid intermittent portion 40 but also the measurer 60 according to, for example, an operating mode. In such an embodiment, the processor 70 may process an image signal and display the measured usage conditions of the metal-air battery 1 based on the processed signal.

In an exemplary embodiment, the processor 70 may include a single micro processor module or a combination of a plurality of micro processor modules. However, an embodiment of the processor 70 is not limited thereto. In one alternative exemplary embodiment, for example, the processor 70 may be a part of a battery management system ("BMS").

The memory 80 may store a program for operation of the metal-air battery 1 and data required therefor. The memory 80 may be a typical recording medium and may include, for example, a hard disk drive ("HDD"), a read only memory ("ROM"), a random access memory ("RAM"), a flash memory, or a memory card, for example.

The memory 80 may store a program for controlling the first fluid intermittent portion 40 according to an operating mode of the metal-air battery 1, or a program for controlling the first fluid intermittent portion 40 according to the usage conditions of the metal-air battery 1, which is measured by the measurer 60.

The user interface 90 may include an input unit which may receive an input for operating the operating mode of the metal-air battery 1 and an output unit which may output information about the measured usage conditions of the metal-air battery 1.

The user interface 90 may include a button, a key pad, a switch, a dial or touch interface, for example, to set the operating mode of the metal-air battery 1. The user interface 90 may include a display unit which may display an image and may be realized as a touch screen. The display unit, which is a display panel, may include a liquid crystal display ("LCD") panel or an organic light emitting device ("OLED") panel and may display information about the measured usage conditions of the metal-air battery 1 as an image or text.

In an exemplary embodiment, the measurer 60 is a measuring device that transmits the information about the measured usage conditions of the metal-air battery 1 to the processor 70 after measuring the usage conditions of the metal-air battery 1. In such an embodiment, the usage conditions of the metal-air battery 1 may be a voltage or a charge level of the metal-air battery 1, or an oxygen concentration in the battery cell module 10, and the measurer 60 for measuring the usage conditions of the metal-air battery 1 may include a voltage measurer 610, a current measurer 620, and an oxygen concentration measurer 630. However, exemplary embodiments of the invention are not limited thereto. Alternatively, the usage conditions of the metal-air battery 1 may include another state quantity capable of having an effect on charging and discharging processes of the metal-air battery 1. An operation of the measurer 60 according to an exemplary embodiment will hereinafter be described in greater detail with reference to FIGS. 3 to 6.

Figure 3:
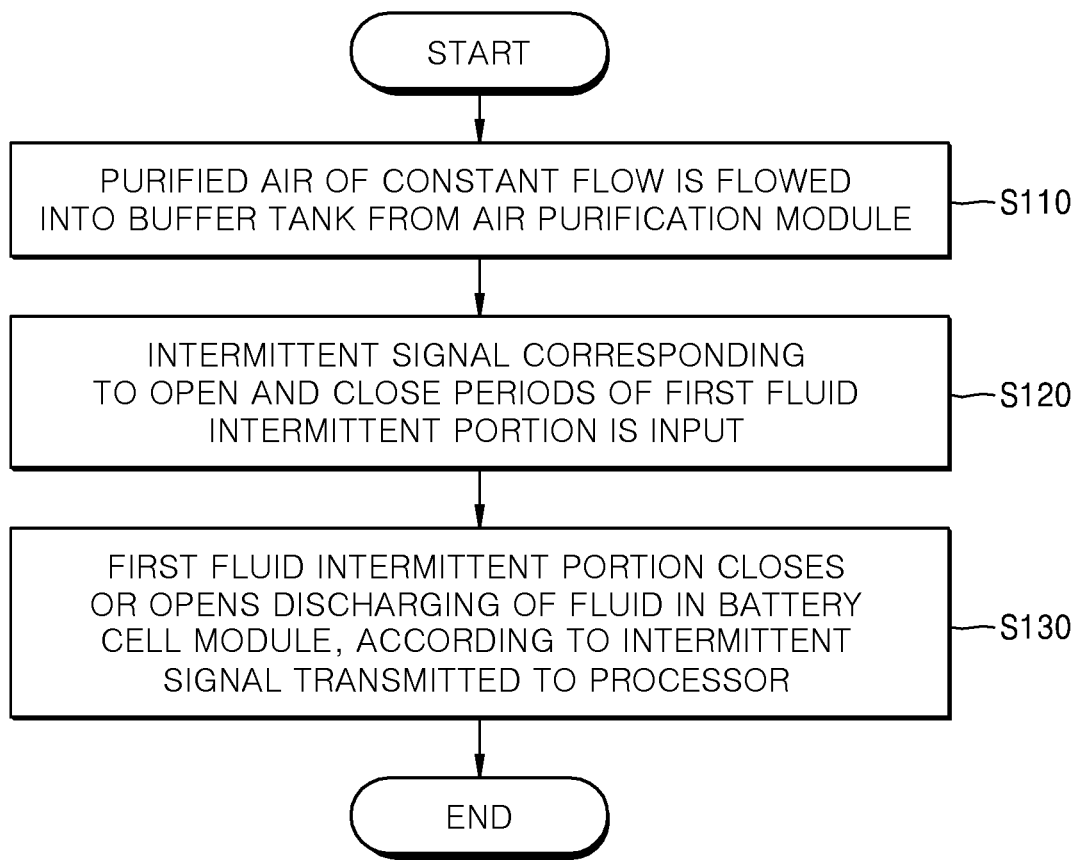
FIG. 3 is a flowchart illustrating a method in which a first fluid intermittent portion closes or opens a path of the flow of oxygen based on an input intermittent signal, according to an exemplary embodiment.

FIG. 3 is a flowchart illustrating a method in which the first fluid intermittent portion 40 closes or opens the flow of oxygen based on an input intermittent signal, according to an exemplary embodiment. Herein, "close or open a flow" may mean close or open a flow path or channel.

Referring to FIGS. 2B and 3, in an exemplary embodiment, the purified air A2 of constant flow is flowed into the buffer tank 30 from the air purification module 20 (S110).

In such an embodiment, the internal pressure of the buffer tank 30 may be larger than the internal pressure of the battery cell module 10, such that the purified air A2 may be transmitted from the buffer tank 30 to the battery cell module 10.

In one exemplary embodiment, for example, the internal pressure of the buffer tank 30 and the internal pressure of the battery cell module 10 may be controlled by using a first pressure gauge 21 and a second pressure gauge 22, which are disposed in the battery cell module 10 and the buffer tank 30, respectively, and by controlling the flow of the purified air A2 which is supplied from the air purification module 20, and a difference between the internal pressure of the buffer tank 30 and the internal pressure of the battery cell module 10 is maintained at about a constant value such that a constant flow of the purified air A2 may be supplied to the battery cell module 10 from the buffer tank 30.

In such an embodiment, the intermittent signal corresponding to the open and close periods of the first fluid intermittent portion 40 is input (S120).

The first fluid intermittent portion 40 may iteratively perform open and close processes at a certain or predetermined cycle based on, for example, discharging nitrogen ($N_2$) or impurities in the battery cell module 10. In an exemplary embodiment, a user may input the intermittent signal that controls the open and close periods of the first fluid intermittent portion 40 via the user interface 90, and the input intermittent signal may be transmitted to the processor 70.

In such an embodiment, the first fluid intermittent portion 40 controls discharging, e.g., closes or opens a flow path, of fluid in the battery cell module 10, according to the intermittent signal transmitted to the processor 70 (S130).

In response to the intermittent signal that determines the open and close periods of the first fluid intermittent portion 40 is transmitted to the processor 70, the processor 70 transmits a control signal to the first fluid intermittent portion 40 to control or change open and close periods of the first fluid intermittent portion 40. In such embodiment, a rate of discharging the nitrogen ($N_2$) or impurities in the battery cell module 10 to the outside may be determined during a discharging process of the metal-air battery 1 based on the transmitted control signal.

In one exemplary embodiment, for example, when an intermittent signal of periodic open and close periods of the first fluid intermittent portion 40 is transmitted to the processor 70, the rate of discharging the nitrogen ($N_2$) or impurities in the battery cell module 10 to the outside may be constantly maintained by periodic opening and closing of the first fluid intermittent portion 40 corresponding to a predetermined cycle during the discharging process of the metal-air battery 1. In one exemplary embodiment, for example, when the rate of discharging the nitrogen ($N_2$) or impurities in the battery cell module 10 to the outside is constantly maintained by periodically opening and closing the first fluid intermittent portion 40 at the predetermined cycle, the metal-air battery 1 may be operated in a steady state.

Figure 4:
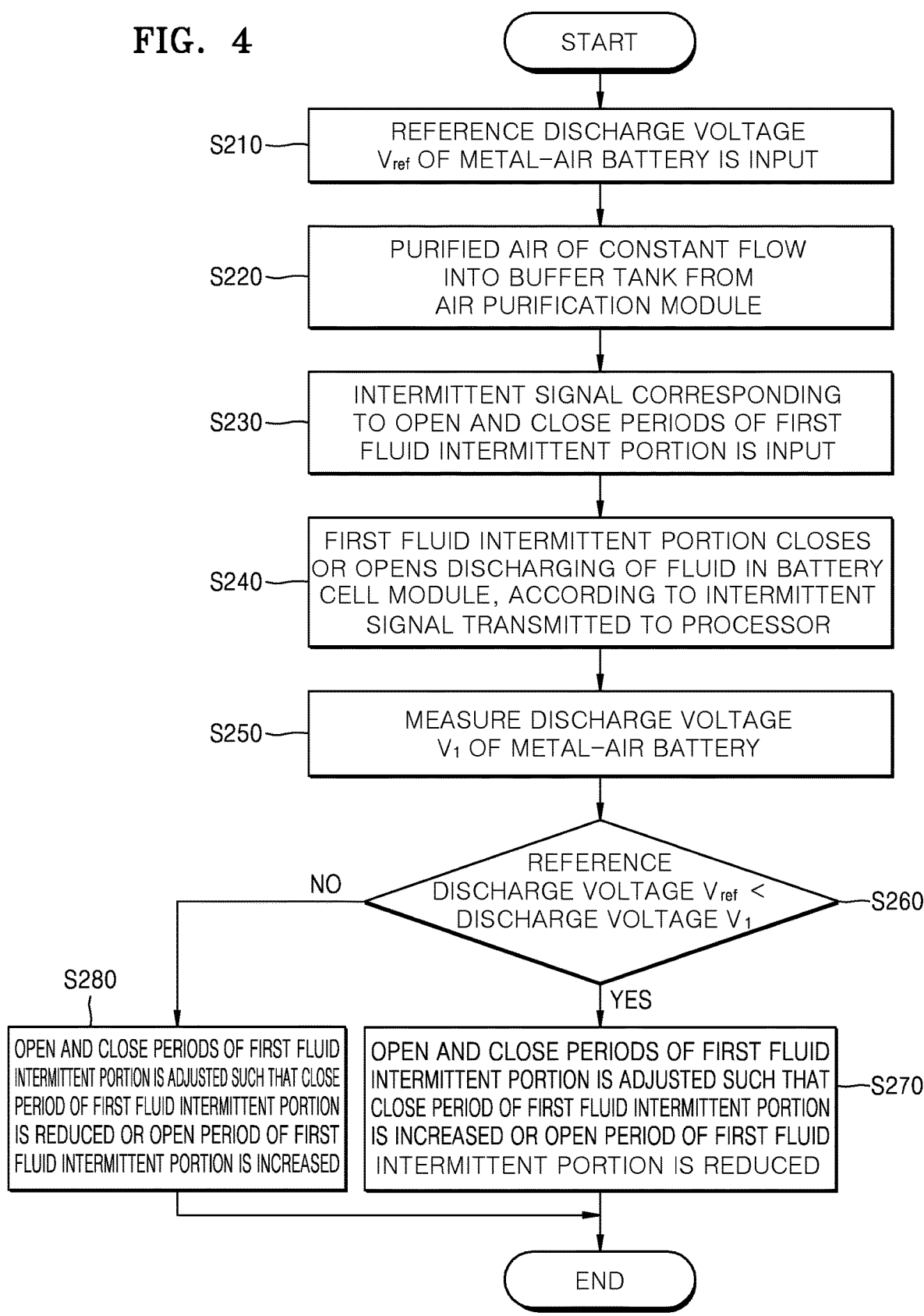
FIG. 4 is a flowchart illustrating a method in which a first fluid intermittent portion closes or opens a path of the flow of oxygen based on based on a discharge voltage measured in a metal-air battery, according to an exemplary embodiment.

FIG. 4 is a flowchart illustrating a method in which the first fluid intermittent portion 40 closes or opens a path of the flow of oxygen based on a discharge voltage measured in the metal-air battery 1, according to an exemplary embodiment.

Referring to FIGS. 2B and 4, in an exemplary embodiment, a reference discharge voltage $V_{ref}$ of the metal-air battery 1 is input (S210).

An open circuit voltage ("OCV") of the metal-air battery 1 may be input via the user interface 90 or pre-stored in the memory 80. In an exemplary embodiment, where a driving device 100, for example, an electric motor installed in an electric vehicle, is attached or connected to the metal-air battery 1, the reference discharge voltage $V_{ref}$ of the metal-air battery 1 may be input via the user interface 90 set based on a reference discharge voltage value stored in the memory 80, or may be determined based on an output voltage used by the driving device 100 and a durability of the metal-air battery 1. In one exemplary embodiment, for example, the OCV of the metal-air battery may be about 3.8 volts (V) and the reference discharge voltage $V_{ref}$ may be in a range of about 2.7 V to about 2.8 V, but not being limited thereto.

In such an embodiment, the purified air A2 of constant flow is flowed into the buffer tank 30 from the air purification module 20 (S220).

In such an embodiment, the intermittent signal corresponding to the open and close periods of the first fluid intermittent portion 40 is input (S230).

In such an embodiment, the first fluid intermittent portion 40 controls discharging, e.g., closes or opens a flow path, of fluid in the battery cell module 10, based on the intermittent signal transmitted to the processor 70 (S240).

The processes of S220 to S240 are substantially the same as those described above with reference to FIG. 3, and any repetitive detailed description thereof will be omitted.

In such an embodiment, a voltage measurer 610 may measure a discharge voltage $V_1$ of the metal-air battery 1 (S250).

When the metal-air battery 1 operates using the purified air A2 which is supplied from the air purification module 20 to the battery cell module 10, the voltage measurer 610 may measure the discharge voltage $V_1$ of the metal-air battery 1.

When the discharge voltage $V_1$ of the metal-air battery 1 is measured by the voltage measurer 610, the purified air A2 may flow at a constant rate from the air purification module 20 to the battery cell module 10 via the buffer tank 30. In such an embodiment, the first fluid intermittent portion 40 may block fluid in the battery cell module 10 not to be discharged to the outside by closing flow of the fluid, or may discharge the fluid at a constant rate by opening and closing flow of the fluid.

In such an embodiment, the processor 70 compares the discharge voltage $V_1$ to the reference discharge voltage $V_{ref}$ (S260).

The discharge voltage $V_1$ of the metal-air battery 1 measured by the voltage measurer 610 may be transmitted to the processor 70. The processor 70 determines whether the discharge voltage $V_1$ is less than the reference discharge voltage $V_{ref}$ by comparing the level of the reference discharge voltage $V_{ref}$ to the level of the discharge voltage $V_1$ transmitted from the voltage measurer 610.

In such an embodiment, when the discharge voltage $V_1$ is equal to or greater than the reference discharge voltage $V_{ref}$, closing of the first fluid intermittent portion 40 is maintained, or open and close periods of the first fluid intermittent portion 40 may be adjusted such that the close period of the first fluid intermittent portion 40 is increased or the open period of the first fluid intermittent portion 40 is reduced (S270).

When the processor 70 determines that the discharge voltage $V_1$ is equal to or greater than the reference discharge voltage $V_{ref}$, the processor 70 determines that the amount of oxygen in the battery cell module 10 is large enough for discharging the battery cell module 10 at a desired rate. Therefore, in such an embodiment, the closing of the first fluid intermittent portion 40 may be maintained, or the open and close periods of the first fluid intermittent portion 40 may be adjusted such that the close period of the first fluid intermittent portion 40 is increased or the open period of the first fluid intermittent portion 40 is reduced with the periodic cycle of the first fluid intermittent portion 40. As a result, a discharge rate of nitrogen or impurities in the battery cell module 10 may be maintained or reduced.

In such an embodiment, if the discharge voltage $V_1$ is determined as being less than the reference discharge voltage $V_{ref}$, it is determined that the amount of oxygen in the battery cell module 10 is not large enough, and thus the processor 70 opens the closing of the first fluid intermittent portion 40 or adjusts the open and close periods of the first fluid intermittent portion 40 such that the close period of the first fluid intermittent portion 40 is reduced or the open period of the first fluid intermittent portion 40 is increased according to the periodic cycle of the first fluid intermittent portion 40 (S280).

When the processor 70 determines that the discharge voltage $V_1$ is lower than the reference discharge voltage $V_{ref}$, the processor 70 determines that the amount of oxygen in the battery cell module 10 is not large enough for discharging the battery cell module 10 at a desired rate.

When the processor 70 determines that the discharge rate is less than a desired discharge rate, the processor 70 opens the closing of the first fluid intermittent portion 40, or transmits a control signal to the first fluid intermittent portion 40 for reducing the close period or increasing the open period of each periodic cycle of the first fluid intermittent portion 40. Thus, the nitrogen ($N_2$) or impurities in the battery cell module 10 may be discharged at a faster rate or speed to the outside of the battery cell module 10 during the discharging process of the metal-air battery 1. In such an embodiment, as the purified air A2 is supplied from the air purification module 20 at a constant rate or speed, the amount of oxygen in the battery cell module 10 may become larger. As the amount of oxygen in the battery cell module 10 becomes larger, the discharging process may be performed more smoothly and thus the discharge voltage $V_1$ may increase until the discharge voltage $V_1$ becomes equal to about the reference discharge voltage $V_{ref}$.

Figure 5:
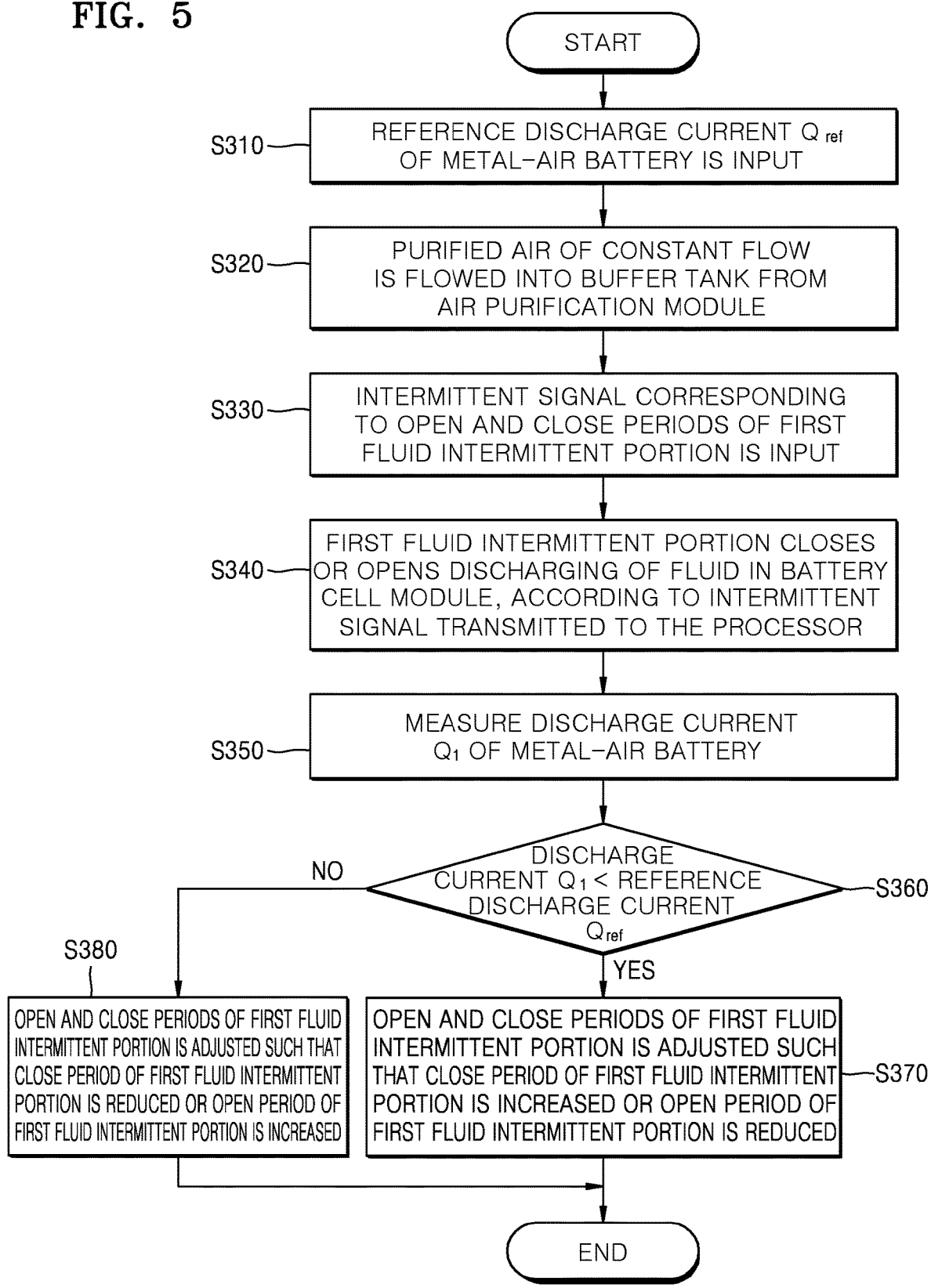
FIG. 5 is a flowchart illustrating a method in which a first fluid intermittent portion closes or opens a path of the flow of oxygen based on a discharge current measured in a metal-air battery, according to an exemplary embodiment.

FIG. 5 is a flowchart illustrating a method in which the first fluid intermittent portion 40 closes or opens a path of the flow of oxygen based on a discharge current Q measured in the metal-air battery 1, according to an exemplary embodiment.

Referring to FIGS. 2B and 5, in an exemplary embodiment, a reference discharge current $Q_{ref}$ of the metal-air battery 1 is input (S310).

The reference discharge current $Q_{ref}$ of the metal-air battery 1 may be input via the user interface 90 or pre-stored in the memory 80. The reference discharge current $Q_{ref}$ may be changed based on a driving state of the driving device 100 which is used in the metal-air battery 1.

In such an embodiment, the purified air A2 of constant flow is flowed into the buffer tank 30 from the air purification module 20 (S320).

In such an embodiment, the intermittent signal corresponding to the open and close periods of the first fluid intermittent portion 40 is input (S330).

In such an embodiment, the first fluid intermittent portion 40 controls discharging, e.g., closes or opens a flow path, of fluid in the battery cell module 10, according to the intermittent signal transmitted to the processor 70 (S340).

The processes of S320 to S340 are substantially the same as those described above with reference to FIG. 3, and any repetitive detailed description thereof will be omitted.

In such an embodiment, the current measurer 620 may measure a discharge current Q of the metal-air battery 1 (S350).

The current measurer 620 may include a current integrator that performs current integration corresponding to a current measuring signal from a predetermined starting time to a predetermined ending time. In an exemplary embodiment, the current measuring signal of the metal-air battery 1 may be supplied to the current integrator, and the current integrator may measure the discharge current Q of the metal-air battery 1 by performing current integration corresponding to the current measuring signal at a predetermined time interval.

When the discharge current Q of the metal-air battery 1 is measured by the current measurer 620, the purified air A2 may be constantly supplied from the air purification module 20 to the battery cell module 10 via the buffer tank 30. In such an embodiment, the first fluid intermittent portion 40 may block fluid in the battery cell module 10 not to be discharged to the outside by closing flow of the fluid, or may discharge the fluid at a constant rate by opening and closing flow of the fluid.

In such an embodiment, the processor 70 determines whether the discharge current Q of the metal-air battery 1 is smaller than the reference discharge current $Q_{ref}$ (S360).

The discharge current Q of the metal-air battery 1 measured by the current measurer 620 may be transmitted to the processor 70. The processor 70 determines whether the discharge current Q is smaller than the reference discharge current $Q_{ref}$ by comparing the reference discharge current $Q_{ref}$ with the discharge current Q of the metal-air battery 1.

In such an embodiment, when the discharge current Q of the metal-air battery 1 is not larger than the reference discharge current $Q_{ref}$, closing of the first fluid intermittent portion 40 is maintained, or open and close periods of the first fluid intermittent portion 40 may be adjusted such that the close period of the first fluid intermittent portion 40 is increased or the open period of the first fluid intermittent portion 40 is reduced (S370).

When the processor 70 determines that the discharge current Q of the metal-air battery 1 is not larger than the reference discharge current $Q_{ref}$, the processor 70 determines that the amount of oxygen in the battery cell module 10 is large enough for discharging the battery cell module 10 at a desired rate. Therefore, the closing of the first fluid intermittent portion 40 may be maintained, or the open and close periods of the first fluid intermittent portion 40 may be adjusted such that the close period of the first fluid intermittent portion 40 increases or the open period of the first fluid intermittent portion 40 is reduced. As a result, a discharge rate of nitrogen or impurities in the battery cell module 10 may be maintained or reduced.

In such an embodiment, if the discharge current Q of the metal-air battery 1 is larger than the reference discharge current $Q_{ref}$, it is determined that the amount of oxygen in the battery cell module 10 is not large enough, and thus the processor 70 opens the closing of the first fluid intermittent portion 40 or adjusts the open and close periods of the first fluid intermittent portion 40 such that the close period of the first fluid intermittent portion 40 is reduced or the open period of the first fluid intermittent portion 40 is increased (S380).

When the processor 70 determines that the discharge current Q of the metal-air battery 1 is greater than the reference discharge voltage $V_{ref}$, the processor 70 determines that the amount of oxygen in the battery cell module 10 is not large enough for discharging the battery cell module 10 at a desired rate.

When the processor 70 determines that the discharge rate is less than the desired discharge rate, the processor 70 controls the second fluid intermittent portion 50 to open, or adjusts the open and close periods of the first fluid intermittent portion 40 such that the close period of the first fluid intermittent portion 40 is reduced or the open period of the first fluid intermittent portion 40 is increased. Thus, the nitrogen ($N_2$) or impurities in the battery cell module 10 may be discharged at a faster rate or speed to the outside of the battery cell module 10 during the discharging process of the metal-air battery 1. In such an embodiment, as the purified air A2 is supplied from the air purification module 20 at a constant rate or speed, the amount of oxygen in the battery cell module 10 may become larger. As the amount of oxygen in the battery cell module 10 is larger, the discharging process may be performed more smoothly and thus the discharge current Q of the metal-air battery 1 may increase.

Figure 6:
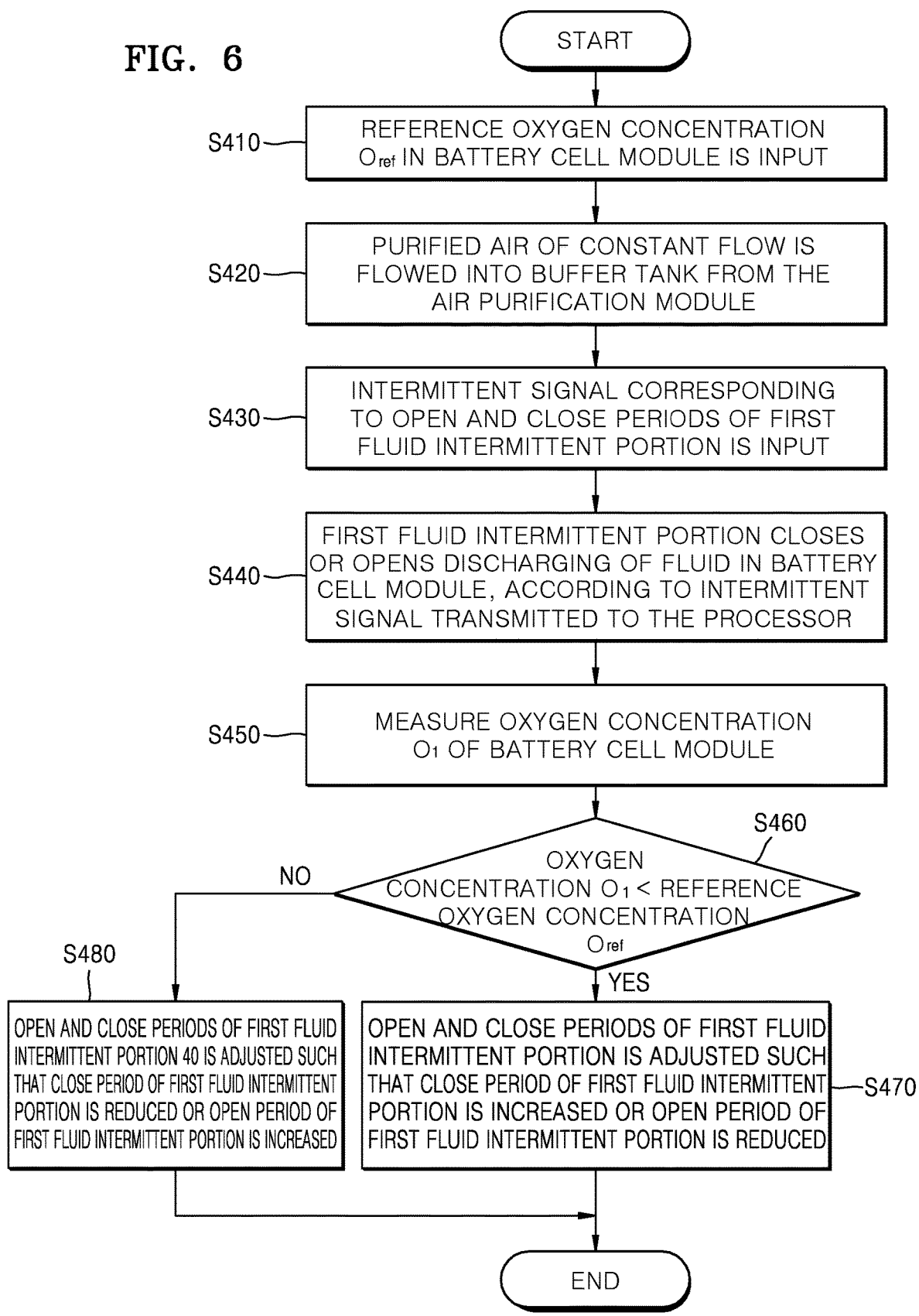
FIG. 6 is a flowchart illustrating a method in which a first fluid intermittent portion closes or opens a path of the flow of oxygen based on an oxygen concentration measured in a battery cell module, according to an exemplary embodiment.

FIG. 6 is a flowchart illustrating a method in which the first fluid intermittent portion 40 closes or opens a path of the flow of oxygen based on an oxygen concentration measured in the battery cell module 10, according to an exemplary embodiment.

Referring to FIGS. 2B and 6, in an exemplary embodiment, a reference oxygen concentration $O_{ref}$ in the battery cell module 10 is input, or the reference oxygen concentration $O_{ref}$ based on the input reference discharge voltage $V_{ref}$ or the reference discharge current $Q_{ref}$ is calculated (S410).

The reference oxygen concentration $O_{ref}$ in the battery cell module 10 may be input via the user interface 90 or pre-stored in the memory 80. In such an embodiment, the reference oxygen concentration $O_{ref}$ may be determined based on capacity of the battery cell module 10, using the reference discharge voltage $V_{ref}$ or the reference discharge current $Q_{ref}$ of the metal-air battery 1.

In such an embodiment, the purified air A2 of constant flow is flowed into the buffer tank 30 from the air purification module 20 (S420).

In such an embodiment, the intermittent signal corresponding to the open and close periods of the first fluid intermittent portion 40 is input (S430).

In such an embodiment, the first fluid intermittent portion 40 controls discharging, e.g., closes or opens a flow path, of fluid in the battery cell module 10, according to the intermittent signal transmitted to the processor 70 (S440).

The processes of S420 to S440 are substantially the same as those described above with reference to FIG. 3, and any repetitive detailed description thereof will be omitted.

In such an embodiment, the oxygen concentration measurer 630 may measure oxygen concentration $O_1$ of the battery cell module 10 (S450).

When the metal-air battery 1 operates according to the purified air A2 which is supplied from the air purification module 20 to the battery cell module 10, the oxygen concentration measurer 630 may measure the oxygen concentration $O_1$ of the battery cell module 10. In one exemplary embodiment, for example, the oxygen concentration measurer 630 may be a concentration cell type sensor or a magnetic sensor. In an exemplary embodiment, a sensing region may be defined to locate between a rear end portion of the battery cell module 10 and the first fluid intermittent portion. However, exemplary embodiments are not limited thereto, and alternatively, the oxygen concentration measurer 630 may be any measurement device capable of measuring an oxygen concentration in the battery cell module 10 and may be disposed in the battery cell module 10.

When the oxygen concentration $O_1$ of the battery cell module 10 is measured by the oxygen concentration measurer 630, the purified air A2 may be constantly supplied from the air purification module 20 to the battery cell module 10 via the buffer tank 30. In such an embodiment, the first fluid intermittent portion 40 may block fluid in the battery cell module 10 not to be discharged to the outside by closing flow of the fluid, or may discharge the fluid at a constant rate by opening and closing flow of the fluid.

In such an embodiment, the processor 70 determines whether the oxygen concentration $O_1$ in the battery cell module 10 is less than the reference oxygen concentration $O_{ref}$ (S460).

The oxygen concentration $O_1$ in the battery cell module 10 measured by the oxygen concentration measurer 630 may be transmitted to the processor 70. The processor 70 determines whether the oxygen concentration $O_1$ is less than the reference oxygen concentration $O_{ref}$ by comparing the reference oxygen concentration $O_{ref}$ with the oxygen concentration $O_1$ in the battery cell module 10.

In such an embodiment, when the oxygen concentration $O_1$ in the battery cell module 10 is equal to or greater than the reference oxygen concentration $O_{ref}$, closing of the first fluid intermittent portion 40 is maintained, or open and close periods of the first fluid intermittent portion 40 may be adjusted such that the close period of the first fluid intermittent portion 40 increases or the open period of the first fluid intermittent portion 40 is reduced (S470).

When the processor 70 determines that the oxygen concentration $O_1$ in the battery cell module 10 is equal to or greater than the reference oxygen concentration $O_{ref}$, the processor 70 determines that the amount of oxygen in the battery cell module 10 is large enough for discharging the battery cell module 10 at a desired rate. Therefore, the closing of the first fluid intermittent portion 40 may be maintained, or the open and close periods of the first fluid intermittent portion 40 may be adjusted such that the close period of the first fluid intermittent portion 40 increases or the open period of the first fluid intermittent portion 40 is reduced. As a result, a discharge rate of nitrogen or impurities in the battery cell module 10 may be maintained or reduced.

In such an embodiment, if the oxygen concentration $O_1$ in the battery cell module 10 is less than the reference oxygen concentration $O_{ref}$, it is determined that the amount of oxygen in the battery cell module 10 is not large enough, and thus the processor 70 opens the closing of the first fluid intermittent portion 40 or adjusts the open and close periods of the first fluid intermittent portion 40 such that the close period of the first fluid intermittent portion 40 is reduced or the open period of the first fluid intermittent portion 40 increases (S480).

When the processor 70 determines that the oxygen concentration $O_1$ in the battery cell module 10 is less than the reference oxygen concentration $O_{ref}$, the processor 70 determines that the amount of oxygen in the battery cell module 10 is not large enough for discharging the battery cell module 10 at a desired rate.

When the processor 70 determines that the discharge rate is less than a desired discharge rate, the processor 70 opens the closing of the first fluid intermittent portion 40, or transmits a control signal changing the close period as shorter or the open period as longer with a periodic cycle of the first fluid intermittent portion 40 to the first fluid intermittent portion 40. Thus, the nitrogen ($N_2$) or impurities in the battery cell module 10 may be discharged at a faster speed to the outside of the battery cell module 10 during the discharging process of the metal-air battery 1. In such an embodiment, as the purified air A2 is supplied from the air purification module 20 at a constant speed, the amount of oxygen in the battery cell module 10 may become larger. As the amount of the oxygen in the battery cell module 10 is larger, the discharging process may be performed more smoothly, and thus the oxygen concentration $O_1$ in the battery cell module 10 may increase until the oxygen concentration $O_1$ equals the reference oxygen concentration $O_{ref}$.

Figure 7:
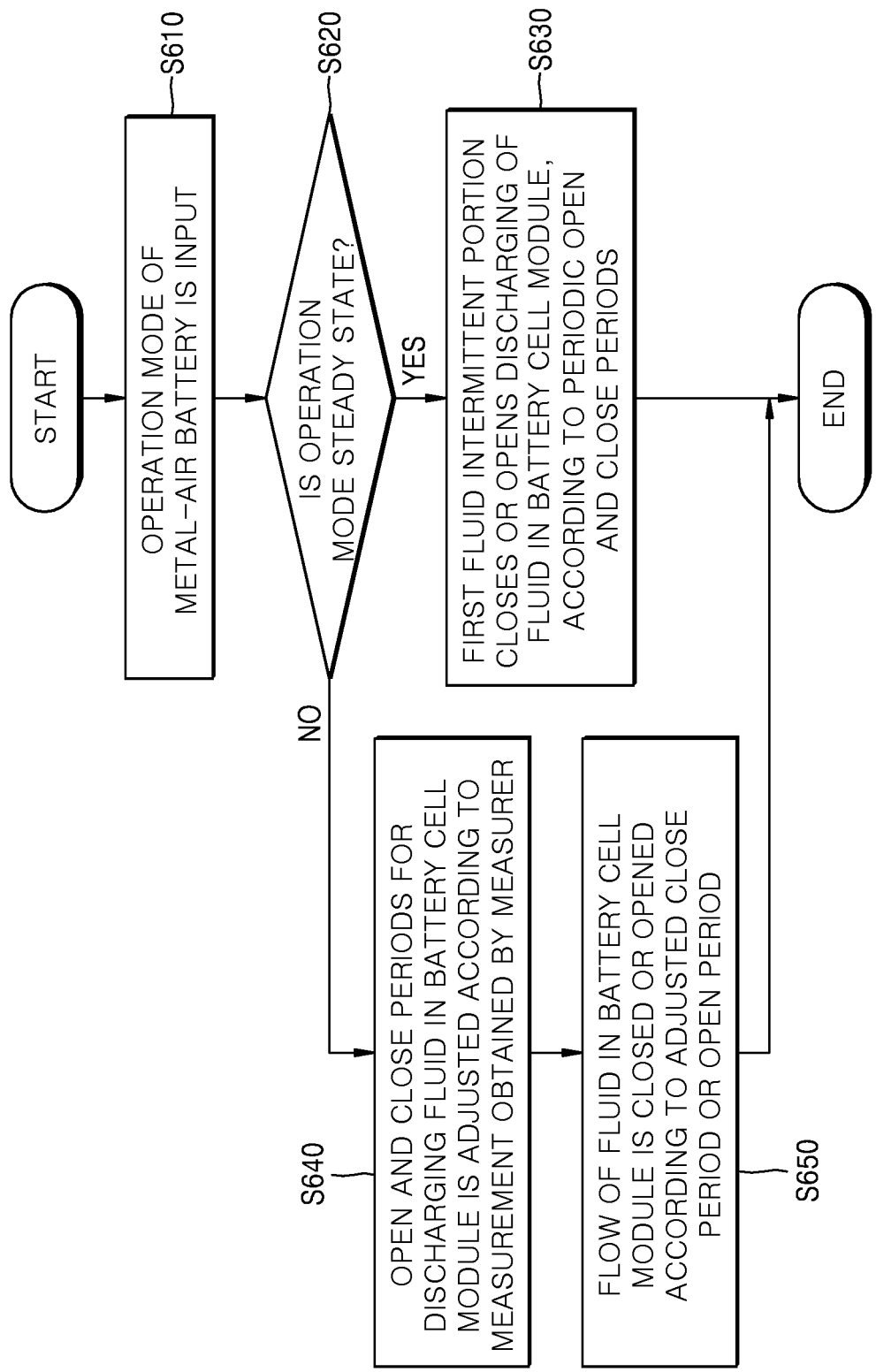
FIG. 7 is a flowchart illustrating a method of determining an operation mode of a metal-air battery, according to an exemplary embodiment.

FIG. 7 is a flowchart illustrating a method of determining an operation mode of the metal-air battery 1, according to an exemplary embodiment.

In an exemplary embodiment, an operation mode of the metal-air battery 1 is set to a steady state or a transition state (S610).

The metal-air battery 1 may be operated in a steady state or a transition state in which the metal-air battery 1 changes from a first steady state to a second steady state. The operation mode of the metal-air battery 1 according to the driving state of the driving device 100 may be input via the user interface 90.

In such an embodiment, a processor 70 determines whether the metal-air battery 1 is in a steady state or a transition state (S620).

In such an embodiment, when the processor 70 determines that the metal-air battery 1 is in a steady state, the first fluid intermittent portion 40 controls discharging, e.g., closes or opens a flow path, of fluid in the battery cell module 10, according to periodic open and close periods (S630).

The first fluid intermittent portion 40 may iteratively perform open and close processes based on, for example, discharging nitrogen ($N_2$) or impurities in the battery cell module 10 according to an input signal which is input via the user interface 90 or pre-stored in the memory 80. In an exemplary embodiment, the measurer 60 for measuring an output voltage and a discharge current of the metal-air battery 1 or an oxygen concentration in the battery cell module 10 may be omitted, and thus power for driving the measurer 60 may be omitted.

In such an embodiment, when the processor 70 determines that the metal-air battery 1 is in a transition state, the first fluid intermittent portion 40 adjusts open and close periods for discharging fluid in the battery cell module 10 according to a measurement obtained by the measurer 60 (S640).

The first fluid intermittent portion 40 adjusts open and close periods for discharging the nitrogen ($N_2$) or the impurities in the battery cell module 10 according to the measured output voltage or the measured discharge current of the metal-air battery 1, or the measured oxygen concentration in the battery cell module 10 as obtained by the measurer 60 described above. In such an embodiment, the operation mode of the metal-air battery 1 may be changed according to a sensing result obtained by the measurer 60, such that discharge and charge processes of the metal-air battery 1 may be performed more smoothly.

In such an embodiment, flow of fluid in the battery cell module 10 may be closed or opened according to the adjusted close period or open period (S650).

As described above, according to exemplary embodiments of the invention, the metal-air battery may control flow of fluid flowed into or discharged from the battery cell module without a separate pressurization unit or decompression unit, as the buffer tank having an internal pressure higher than an internal pressure of the battery cell module, and the first fluid intermittent portion controlling flow of fluid discharged from the battery cell module are disposed in the metal-air battery.

In such embodiments, the amount of oxygen in the battery cell module is adjusted by controlling opening/closing of the first fluid intermittent portion according to a state of the metal-air battery or the battery cell module, and thus the metal-air battery may be efficiently operated.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the invention as defined by the following claims.

What is claimed is:

1. A metal-air battery comprising:
   a battery cell module which generates electricity through metal oxidation and oxygen reduction;
   a buffer tank which fluidly communicates with the battery cell module and has an internal pressure higher than an internal pressure of the battery cell module;
   an air purification module which fluidly communicates with the buffer tank and continuously provides purified air to the buffer tank;
   a first fluid intermittent portion which controls a flow of fluid from the battery cell module to an outside of the battery cell module; and
   a processor which controls predetermined open and close periods of the first fluid intermittent portion,
   wherein the purified air flowed into the buffer tank from the air purification module is transmitted from the buffer tank to the battery cell module by a difference between the internal pressure of the buffer tank and the internal pressure of the battery cell module without a separate pressurization unit or decompression unit.

2. The metal-air battery of claim 1, further comprising:
   a second fluid intermittent portion which controls a flow of fluid from the buffer tank to the battery cell module.

3. The metal-air battery of claim 2, wherein the second fluid intermittent portion comprises a check valve.

4. The metal-air battery of claim 1, wherein the first fluid intermittent portion closes and opens a path of the flow of the fluid from the battery cell module to the outside, based on the predetermined open and close periods.

5. The metal-air battery of claim 1, further comprising:
   a voltage measurer which measures a discharge voltage of the metal-air battery, wherein
   the predetermined open and close periods are determined based on a comparison between a predetermined reference discharge voltage and the measured discharge voltage.

6. The metal-air battery of claim 1, further comprising:
   a current measurer which measures a discharge current of the metal-air battery, wherein
   the predetermined open and close periods are determined based on a comparison between a predetermined reference discharge current and the measured discharge current.

7. The metal-air battery of claim 1, further comprising:
   an oxygen concentration measurer which measures an oxygen concentration in the battery cell module, wherein the predetermined open and close periods are determined based on a comparison between a predetermined reference oxygen concentration and the measured oxygen concentration.

8. The metal-air battery of claim 1, wherein a difference between the internal pressure of the battery cell module and the internal pressure of the buffer tank is in a range of about 0.5 bar to about 1 bar.

9. The metal-air battery of claim 1, wherein the first fluid intermittent portion comprises an electromagnetic driving type opening/closing valve.

10. A method of operating the metal-air battery of claim 1, the method comprising:
flowing purified air at a constant flow rate into the buffer tank from the air purification module;
inputting an intermittent signal corresponding to the predetermined open and close periods of the first fluid intermittent portion; and
controlling the flow of the fluid from the battery cell module to the outside, based on the predetermined close and open periods.

11. The method of claim 10, further comprising:
inputting a reference discharge voltage of the metal-air battery;
measuring a discharge voltage of the metal-air battery; and
comparing a level of the reference discharge voltage with a level of the discharge voltage.

12. The method of claim 11, further comprising:
adjusting at least one of the predetermined close and open periods of the first fluid intermittent portion such that the predetermined open period increases or the predetermined close period is reduced, when the discharge voltage is less than the reference discharge voltage.

13. The method of claim 11, further comprising:
adjusting at least one of the predetermined close and open periods of the first fluid intermittent portion such that the predetermined open period is reduced or the predetermined close period increases, when the discharge voltage is greater than the reference discharge voltage.

14. The method of claim 10, further comprising:
inputting a reference discharge current of the metal-air battery;
measuring a discharge current of the metal-air battery; and
comparing the reference discharge current with the measured discharge current.

15. The method of claim 14, further comprising:
adjusting at least one of the predetermined close and open periods of the first fluid intermittent portion such that the predetermined open period increases or the predetermined close period is reduced, when the measured discharge current is larger than the reference discharge current.

16. The method of claim 14, further comprising:
adjusting at least one of the predetermined close and open periods of the first fluid intermittent portion such that the predetermined open period is reduced or the predetermined close period is increased, when the measured discharge current is smaller than the reference discharge current.

17. The method of claim 10, further comprising:
inputting a reference oxygen concentration in the battery cell module;
measuring an oxygen concentration in the battery cell module; and
comparing the reference oxygen concentration to the measured oxygen concentration.

18. The method of claim 17, further comprising:
adjusting at least one of the predetermined close and open periods of the first fluid intermittent portion such that the predetermined open period increases or the predetermined close period is reduced, when the oxygen concentration is less than the reference oxygen concentration.

19. The method of claim 17, further comprising:
adjusting at least one of the predetermined close and open periods of the first fluid intermittent portion such that the predetermined open period is reduced or the predetermined close period increases, when the oxygen concentration is greater than the reference oxygen concentration.

* * * * *